United States Patent
Guo et al.

(10) Patent No.: US 8,958,311 B2
(45) Date of Patent: Feb. 17, 2015

(54) TROUBLESHOOTING METHOD AND APPARATUS

(71) Applicant: Huawei Technologies Co., Ltd., Shenzhen (CN)

(72) Inventors: Xinchun Guo, Shenzhen (CN); Wei Cao, Beijing (CN); Guoyi Chen, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/198,117

(22) Filed: Mar. 5, 2014

(65) Prior Publication Data

US 2014/0185459 A1 Jul. 3, 2014

Related U.S. Application Data

(63) Continuation of application No. 13/225,053, filed on Sep. 2, 2011, now Pat. No. 8,699,358, which is a continuation of application No. PCT/CN2010/070818, filed on Mar. 2, 2010.

(30) Foreign Application Priority Data

Mar. 2, 2009 (CN) .......................... 2009 1 0008095

(51) Int. Cl.
*H04L 12/26* (2006.01)
*H04L 12/24* (2006.01)
*H04L 12/703* (2013.01)

(52) U.S. Cl.
CPC ........ *H04L 43/0823* (2013.01); *H04L 41/0677* (2013.01); *H04L 43/0811* (2013.01); *H04L 43/10* (2013.01); *H04L 41/0631* (2013.01); *H04L 41/0681* (2013.01); *H04L 45/28* (2013.01)
USPC ........................................................ 370/244

(58) Field of Classification Search
None
See application file for complete search history.

(56) References Cited

U.S. PATENT DOCUMENTS

| | | | |
|---|---|---|---|
| 7,092,361 B2 * | 8/2006 | Puppa et al. .................. | 370/242 |
| 7,336,615 B1 | 2/2008 | Pan et al. | |
| 7,463,591 B1 | 12/2008 | Kompella et al. | |
| 7,508,755 B2 * | 3/2009 | Liu .............................. | 370/228 |
| 2003/0112749 A1 | 6/2003 | Hassink et al. | |
| 2004/0133368 A1 * | 7/2004 | Johansson et al. ............. | 702/58 |
| 2005/0007960 A1 | 1/2005 | Chen et al. | |
| 2005/0099955 A1 | 5/2005 | Mohan et al. | |
| 2005/0147050 A1 * | 7/2005 | Klink ........................... | 370/244 |

(Continued)

FOREIGN PATENT DOCUMENTS

| CN | 1812401 A | 8/2006 |
|---|---|---|
| CN | 101164261 A | 4/2008 |

(Continued)

OTHER PUBLICATIONS

Chen et al., "Return Path Specified LSP Ping" Network Working Group, Oct. 21, 2013, 18 pages.

*Primary Examiner* — Otis L Thompson, Jr.
(74) *Attorney, Agent, or Firm* — Brinks Gilson & Lione (57) ABSTRACT

A troubleshooting method includes sending a forward detection message to at least one node on a path to be detected. The forward detection message carries information about a forward path to be detected and information about a backward path to be detected. Faults are detected according to a backward detection message returned by the at least one node.

14 Claims, 3 Drawing Sheets

(56) References Cited

U.S. PATENT DOCUMENTS

| | | |
|---|---|---|
| 2005/0185643 A1* | 8/2005 | Goldberg et al. ............. 370/389 |
| 2006/0159008 A1 | 7/2006 | Sridhar et al. |
| 2006/0262728 A1 | 11/2006 | Addeo et al. |
| 2007/0133398 A1 | 6/2007 | Zhai |
| 2007/0242605 A1 | 10/2007 | Lei |
| 2007/0263535 A1 | 11/2007 | Shabtay |
| 2008/0112331 A1 | 5/2008 | Long et al. |
| 2008/0151895 A1 | 6/2008 | Krzanowski |
| 2008/0175144 A1 | 7/2008 | Lu et al. |
| 2008/0316920 A1 | 12/2008 | Chun et al. |
| 2009/0086644 A1 | 4/2009 | Kompella et al. |
| 2011/0280567 A1* | 11/2011 | Lyon et al. ..................... 398/10 |
| 2012/0176911 A1 | 7/2012 | Pan et al. |

FOREIGN PATENT DOCUMENTS

| | | |
|---|---|---|
| WO | WO 2006/076493 A2 | 7/2006 |
| WO | WO 2008/055426 A1 | 5/2008 |

* cited by examiner

TROUBLESHOOTING METHOD AND APPARATUS

CROSS-REFERENCE TO RELATED APPLICATIONS

This application is a continuation of U.S. patent application Ser. No. 13/225,053, filed on Sep. 2, 2011, which is a continuation of International Application No. PCT/CN2010/070818, filed on Mar. 2, 2010. The International Application claims priority to Chinese Patent Application No. 200910008095.0, filed on Mar. 2, 2009. The afore-mentioned patent applications are hereby incorporated by reference in their entireties.

FIELD OF THE APPLICATION

The present application relates to the field of communication technologies, and in particular, to a troubleshooting method and a troubleshooting apparatus.

BACKGROUND OF THE APPLICATION

With the rapid development of information technologies, people require more and more bidirectional interactive services such as Internet access, Video on Demand (VOD), videoconference, videophone, telemedicine, and tele-education. Operators have an urgent need of carrying out such network Value Added Services (VASs) to increase the network operation revenue.

A bidirectional interactive service requires two paths: a forward path for carrying outbound traffic, and a backward path for carrying inbound traffic, to implement the interaction. The traffic in the two directions may be carried over one bidirectional Label Switched Path (LSP) or two specified unidirectional LSPs in two opposite directions, or by other means. A key to ensuring Quality of Service (QoS) of a bidirectional interactive service and deploying the bidirectional interactive service massively is to detect, locate and handle faults in a simple and efficient way.

For a bidirectional interactive service, a fault in one direction may affect or even lead to termination of the service in the other direction, and therefore, the troubleshooting needs to be performed in both directions simultaneously. In other circumstances that involve detection of faults in two directions, it is also necessary to detect, locate and handle the faults in the forward path and the backward path simultaneously, and a technology for detecting and handling the faults in two directions is also required. Besides, a bidirectional troubleshooting tool, which is capable of detecting the forward path and the backward path simultaneously, is required due to the emergence of bidirectional LSPs to detect two directions of a bidirectional LSP simultaneously. A bidirectional LSP may include a forward LSP and a backward LSP that have the same route and the same LSP Identifier (ID), or may include a forward unidirectional LSP and a backward unidirectional LSP that have different LSP IDs and may have different nodes and different links except that the first nodes of the two LSPs are the same.

However, the troubleshooting tools in the prior art such as LSP Ping and LSP Trace generally support only the unidirectional handling mode. If the fault detection is required on the forward path and the backward path respectively, it is necessary to operate the troubleshooting tool on both sides respectively, and detect, locate and handle the faults on both sides independently, and it is necessary to transmit connectivity fault information and switching information between both sides in time to implement protection switching in both directions simultaneously. This handling mode increases the signaling and processing overhead, network load, complexity of operation and maintenance, and the operation cost, and can hardly meet the troubleshooting requirements of bidirectional interactive services.

SUMMARY OF THE APPLICATION

Embodiments below provide a troubleshooting method and a troubleshooting apparatus for solving the technical problems such as fault detection, fault location and fault handling for a bidirectional path that requires bidirectional path detection, and the problems cannot be solved with troubleshooting tools in the prior art.

Such objectives are fulfilled through the following technical solution:

A troubleshooting method includes: sending a forward detection message to at least one node on a path to be detected, where the forward detection message carries information about a forward path to be detected and information about a backward path to be detected; and detecting faults according to a backward detection message returned by the at least one node.

A troubleshooting apparatus includes: a forward detection message sending unit, configured to send a forward detection message to at least one node on a path to be detected, where the forward detection message carries information about a forward path to be detected and information about a backward path to be detected; and a fault detecting unit, configured to detect faults according to a backward detection message returned by the at least one node.

A troubleshooting method includes: receiving a forward detection message sent by a detection initiation node on a path to be detected, where the forward detection message carries information about a forward path to be detected and information about a backward path to be detected; and assembling a backward detection message according to the forward detection message, and sending the backward detection message to the detection initiation node.

A troubleshooting apparatus includes: a forward detection message receiving unit, configured to receive a forward detection message sent by a detection initiation node on a path to be detected, where the forward detection message carries information about a forward path to be detected and information about a backward path to be detected; a backward detection message assembling unit, configured to assemble a backward detection message according to the forward detection message; and a backward detection message sending unit, configured to send the backward detection message to the detection initiation node.

With the troubleshooting method and the troubleshooting apparatus disclosed herein, troubleshooting operations such as fault detection and fault location can be performed for the forward path and the backward path that require bidirectional path detection.

BRIEF DESCRIPTION OF THE DRAWINGS

The drawings listed below are intended to help further understand the claims, and constitute part of this application, but shall not be construed as a limitation on the claims.

DETAILED DESCRIPTION OF THE EMBODIMENTS

To make the objectives, technical solution, and advantages of the claimed system clearer, the following description of various exemplary embodiments is provided with reference to accompanying drawings. The exemplary embodiments and the description of the embodiments are illustrative in nature, and shall not be construed as limitations on the present invention.

An embodiment provides a troubleshooting method, and is detailed below with reference to an accompanying drawing.

Figure 1:
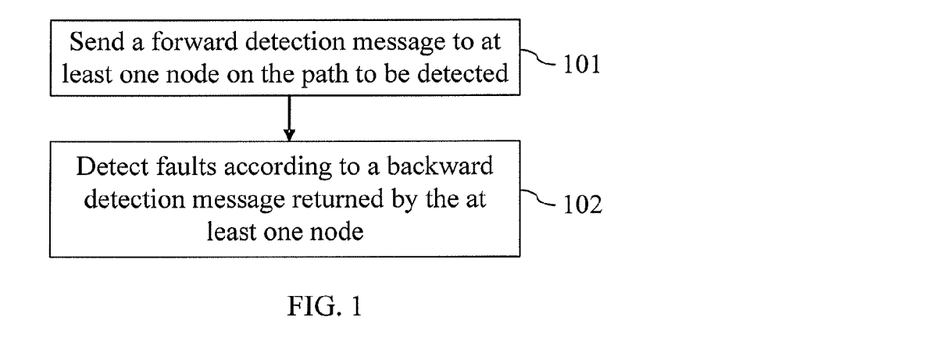
FIG. 1 is a method flowchart according to an embodiment.

FIG. 1 is a method flowchart according to an embodiment. As shown in FIG. 1, the troubleshooting method in this embodiment includes the following steps:

101. A detection initiation node sends a forward detection message to at least one node on a path to be detected, where the forward detection message carries information about a forward path to be detected and information about a backward path to be detected.

This embodiment is applicable to a unidirectional detection scenario, in which the path to be detected has only one direction and no backward path. In this scenario, the forward detection message may carry only information about the forward path to be detected. The information about the forward path to be detected includes destination node, path travelled by the message, and/or message forwarding mode. Therefore, the node that receives the forward detection message can verify consistency of path information and assemble the backward detection message according to the information about the forward path to be detected.

This embodiment is further applicable to the bidirectional detection scenario, in which the path to be detected has a forward direction and a backward direction. In this scenario, the forward detection message not only carries information about the forward path to be detected, but also carries information about the backward path to be detected. The information about the backward path to be detected specifies the backward path for the backward detection message. For example, the information about the backward path to be detected specifies that the mode of returning the backward detection message is to return the message along the backward path corresponding to forward path to be detected (in the case that the forward path to be detected has a backward path). In this way, the backward path is specified. Alternatively, a backward path ID, such as Forwarding Equivalence Class (FEC) ID, an LSP ID, a Tunnel ID, may be used to specify the path for returning the backward detection message. The ID of the path shall not be construed as a limitation on this embodiment. Another mode is: The path for returning the backward detection message is specified by backward path constraint information. In this case, the node that receives the forward detection message further needs to match the path according to the backward path specified in the forward detection message so as to select the path for returning the backward detection message.

102. The detection initiation node detects faults according to the backward detection message returned by the at least one node.

In the case of unidirectional detection, because the information about the forward path to be detected in the forward detection message specifies the path to be traveled by the forward detection message in this embodiment, the node that receives the forward detection message verifies consistency of the forward path to be detected between the data plane and the control plane according to the information about the forward path to be detected, and returns a backward detection message or returns no backward detection message. Therefore, upon receiving the backward detection message, the detection initiation node detects faults according to the content of the backward detection message; if no backward detection message is received, the detection initiation node considers that the path to be detected is faulty.

In the case of bidirectional detection, because the information about the forward path to be detected in the forward detection message specifies the path to be traveled by the forward detection message in this embodiment, and the information about the backward path to be detected in the forward detection message specifies the path to be traveled by the backward detection message, the node that receives the forward detection message verifies consistency of the forward path to be detected between a data plane and a control plane according to the information about the forward path to be detected in the forward detection message, matches the path according to the information about the backward path to be detected in the forward detection message, and returns a backward detection message along a specified path and/or a non-specified path or returns no backward detection message. Therefore, upon receiving the backward detection message, the detection initiation node detects faults according to the state and content of the received backward detection message (which is detailed in other embodiments herein); if no backward detection message is received, the detection initiation node determines whether the path to be detected is faulty according to original settings.

In this embodiment, the path to be traveled by the forward detection message and the path to be traveled by the backward detection message are specified, so that the forward path and the backward path can be detected simultaneously.

A troubleshooting method is provided in another embodiment, and is detailed below with reference to an accompanying drawing.

Figure 2:
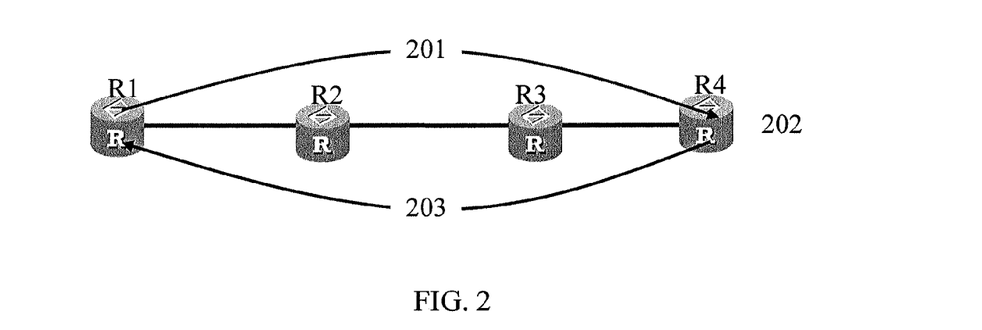
FIG. 2 is a schematic diagram of interaction according to an embodiment.

FIG. 2 is a schematic diagram of interaction for detecting network connectivity by applying the method disclosed herein. In FIG. 2, R1 is a detection initiation node; R2 and R3 are intermediate nodes; and R4 is a destination node. In this embodiment, the forward route (link and nodes) of the path to be detected may be the same as or different from the backward route. As shown in FIG. 2, the troubleshooting method in this embodiment includes the following steps:

201. R1 sends a forward detection message such as a request message. The forward detection message arrives at the destination node R4 after being forwarded by the intermediate nodes R2 and R3.

In this embodiment, in the case of unidirectional detection, the forward detection message carries only information about the forward path to be detected such as destination node, path traveled by the message, or message forwarding mode, so that the destination node R4 can verify consistency of the path between a data plane and a control plane according to such information, and then return the backward detection message such as a reply message along a random path, which is not further detailed here.

In this embodiment, in the case of bidirectional detection, the forward detection message not only carries the information about the forward path to be detected, but also carries the information about the backward path to be detected. The mode of returning the backward detection message can be specified by the information about the backward path to be detected, for example, returning the message along a specified path, returning the message along a random path, or returning the message along a specified path and a random path simultaneously. The specified path here may be a backward path corresponding to the forward path to be detected, or may be a definitely specified backward path, or may be constraint information of a specified backward path, for example, explicit path or other constraint conditions. To achieve that purpose, the forward detection message carries an ID of the specified path for returning the backward detection message.

In the information about the backward path to be detected, one or more backward paths may be specified. In this way, the backward detection message can be returned along multiple specified paths, so that multiple backward paths can be detected simultaneously.

The ID of the path to be traveled specified in the information about the forward path to be detected and the information about the backward path to be detected may be denoted by an FEC ID (Forwarding Equivalence Class), an LSP ID (Label Switch Path identification), and/or a tunnel Tunnel ID (Tunnel identification), or may be constraint information of the backward path, for example, explicit path. The ID of the path shall not be construed as a limitation on this embodiment.

202. R4 receives the forward detection message, verifies consistency of the forward path to be detected between the data plane and the control plane, and assembles and processes a backward detection message according to the mode of returning the backward detection message, where the returning mode is specified in the forward detection message.

The verification of consistency of the forward path to be detected between the data plane and the control plane is to verify consistency of the path to be detected between the data plane and the control plane, namely, to verify whether R4 is the destination node in the forward path in the information about the forward path to be detected, where the information about the forward path to be detected is carried in the forward detection message. If R4 is the destination node, the path is consistent; otherwise, the path is not consistent.

If the mode of returning the backward detection message, which is specified in the information about the backward path to be detected, in the forward detection message is to return the message along a specified path, R4 assembles the backward detection message and adds identification information of the backward path to the backward detection message. For example, the identification information of the backward path is FEC information. Further, R4 matches the backward path according to the identification information of the backward path specified in the information about the backward path to be detected, namely, checks whether R4 has a backward path specified in the forward detection message. If the matching succeeds, R4 sends a backward detection message to R1 along a specified backward path; if the matching fails, R4 sends a backward detection message that carries return code information to R1 along a random path.

The identification information of the backward path, namely, the information about the specified backward path to be detected, carried in the backward detection message may be copied from the forward detection message, or may be added according to the information about the specified backward path to be detected in the forward detection message. The mode of obtaining the identification information of the backward path is not limited in this embodiment.

If the mode of returning the backward detection message specified in the forward detection message is to return the message along a specified path and a non-specified path simultaneously, R4 assembles the backward detection message and matches the backward path in the same way as mentioned above. If the matching succeeds, R4 sends a backward detection message to R1 along a specified path and a random path; if the matching fails, R4 sends a backward detection message that carries return code information to R1 along a random path.

The return code information may be fault type information such as "the specified path does not exist" or "the specified path mismatches", or may be notification information such as "the specified path matches successfully".

The specified path for returning the backward detection message may be identified by adding a Type Length Value (TLV) of the specified path, or by setting the corresponding identification field or other identification information. The identification information of the specified path may be an FEC ID or an LSP ID, and/or a Tunnel ID, or may be constraint information of the backward path, for example, explicit path.

203. R1 receives the backward detection message returned by R4, and determines link connectivity according to the state of receiving the forward detection message and the backward detection message.

After receiving the backward detection message, R1 first determines the path for receiving the backward detection message. If the receiving path is the backward path specified in the forward detection message, namely, if the backward detection message is returned to R1 along the specified backward path, R1 verifies consistency of the backward path to be detected between the data plane and the control plane. If the backward path to be detected is consistent, the bidirectional link is free from connectivity faults; if the backward path is not consistent or the receiving path is not the backward path specified in the forward detection message, namely, if the backward detection message is not returned along the specified backward path, R1 performs further troubleshooting according to the return code information in the backward detection message or notifies the network management system.

If the receiving path is the backward path specified in the forward detection message and a non-specified path, namely, if the backward detection message is returned to R1 along the specified path and the non-specified path simultaneously, R1 also needs to verify consistency of the backward path to be detected between the data plane and the control plane for the backward detection message returned along the specified path, and the verification method is not further detailed here.

If the receiving path is a non-specified path, namely, if the backward detection message is returned to R1 along a non-specified path only, R1 determines whether the path to be detected is faulty according to the return code information in the backward detection message received along other paths.

If R1 receives no backward detection message, the forward path to be detected is probably faulty. In this case, the faulty node may be located by other means, for example, by means of unidirectional ping in the prior art or bidirectional trace in other embodiments. The bidirectional trace in other embodiments is described later.

In this embodiment, the intermediate nodes R2 and R3 only normally forward but do not handle the forward detection message sent by R1 or the backward detection message sent by R4.

In this embodiment, a path is specified for the backward detection message, and therefore, the forward path and the backward path are detected simultaneously, and the troubleshooting method can be executed on only one side to detect faults and verify connectivity in both directions simultaneously.

A troubleshooting method is provided in another embodiment, and is detailed below with reference to an accompanying drawing.

Figure 3:
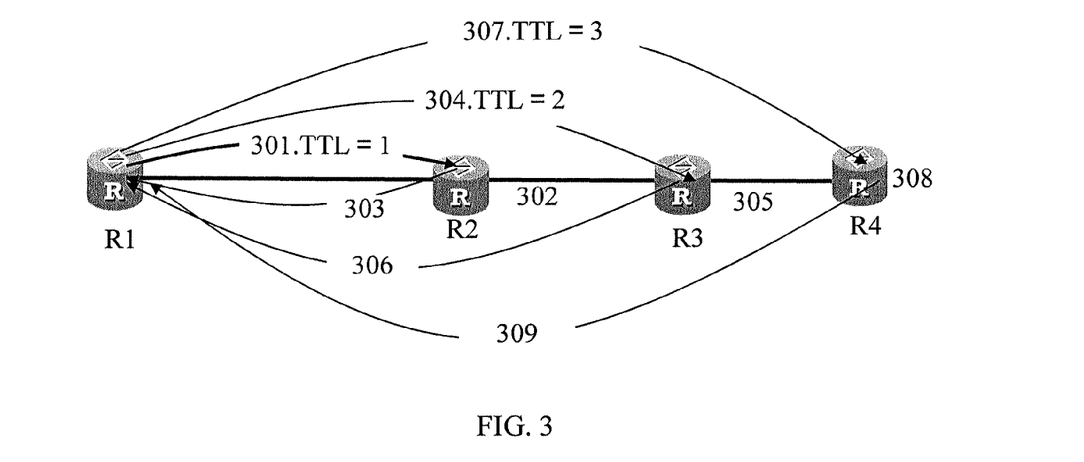
FIG. 3 is a schematic diagram of interaction according to another embodiment.

FIG. 3 is a schematic diagram of interaction for verifying network connectivity by applying the method disclosed herein. In FIG. 3, R1 is a detection initiation node; R2 and R3 are intermediate nodes; and R4 is a destination node. In this embodiment, the forward route (link and nodes) of the path to be detected may be the same as the backward route. As shown in FIG. 3, the troubleshooting method in this embodiment includes the following steps:

301. R1 sends a forward detection message to R2.

The forward detection message could further includes a Collecting Path Information (CPI) indication such as CPI TLV besides the content described in the second embodiment so as to notify the intermediate nodes to collect the information about the path to be detected and return the information to the first node. The collected path information may include: node ID, distance (count of hops) to the first node, label allocated to the previous hop, and previous-hop node ID.

R1 may send the forward detection message to R2 by setting Time To Live (TTL) to 1.

302. R2 receives the forward detection message, verifies consistency of the forward path to be detected between the data plane and the control plane, and assembles and processes a backward detection message.

After receiving the forward detection message, R2 handles the message in the same way as R4 handling the received forward detection message in the second embodiment above, for example, verifies consistency of the path to be detected, assembles the backward detection message, and matches the backward path. Because the forward detection message carries indication information which instructs the intermediate nodes to collect path information, the intermediate node R2 collects path information when assembling the backward detection message, and adds the collected path information to the backward detection message. Afterward, R2 sends the backward detection message to R1 along the path specified in the forward detection message, or along the specified path and a non-specified path, or along a non-specified path simultaneously, which has been described in step 202 in the second embodiment above and is not further detailed here.

The verification of consistency of the path to be detected is to also verify consistency of the forward path to be detected between the data plane and the control plane, namely, to verify whether R2 is the intermediate node or destination node in the forward path to be detected in the information about the forward path to be detected, where the information about the forward path to be detected is carried in the forward detection message.

303. R1 receives the backward detection message returned by R2, and determines link connectivity according to the state of receiving the forward detection message and the backward detection message.

This process is the same as step 203 in the second embodiment above, and is not further detailed here.

If R1 receives no backward detection message returned by R2, the bidirectional link or node between R1 and R2 is regarded as faulty.

304. R1 sends a forward detection message to R3.

This step is the same as step 301 above, which is not further detailed here.

R1 may send the forward detection message to R3 by setting TTL to 2.

305. R3 receives the forward detection message, and assembles and handles a backward detection message.

This step is the same as step 302 above, which is not further detailed here.

306. R1 receives the backward detection message returned by R3, and determines link connectivity according to the state of receiving the forward detection message and the backward detection message.

This step is the same as step 303 above, which is not further detailed here.

If R1 receives no backward detection message returned by R3, the bidirectional link or node between R2 and R3 is regarded as faulty.

307. R1 sends a forward detection message to R4.

This step is the same as step 301 above, which is not further detailed here.

R1 may send the forward detection message to R4 by setting TTL to 3.

308. R4 receives the forward detection message, and assembles and handles a backward detection message.

This step is the same as step 302 above, which is not further detailed here.

309. R1 receives the backward detection message returned by R4, and determines link connectivity according to the state of receiving the forward detection message and the backward detection message.

This step is the same as step 303 above, which is not further detailed here.

If R1 receives no backward detection message returned by R4, the bidirectional link or node between R3 and R4 is regarded as faulty.

In this embodiment, the TTL is set, and the detection initiation node R1 sends a forward detection message to intermediate nodes R2 and R3 and the destination node R4. For example, R1 sends a forward detection message with TTL=1 to R2, and R2 handles the forward detection message, collects path information, records the information into a backward detection message, and returns the backward detection message to the first node R1 along a backward path specified in the forward detection message; afterward, R1 sends a forward detection message with TTL=2 to R3, and R3 handles and assembles the backward detection message in a similar way, and returns the backward detection message to the first node; this process goes on until the message arrives at the destination node R4. By specifying a path for the backward detection message in the forward detection message, the technical solution in this embodiment detects the forward path and the backward path simultaneously, collects the path information at the same time, and detects the paths in both directions simultaneously and verifies connectivity by executing the troubleshooting method on only one side. The signaling overhead is reduced, and the implementation is simplified.

A troubleshooting method is provided in an embodiment, and is detailed below with reference to an accompanying drawing.

Figure 4:
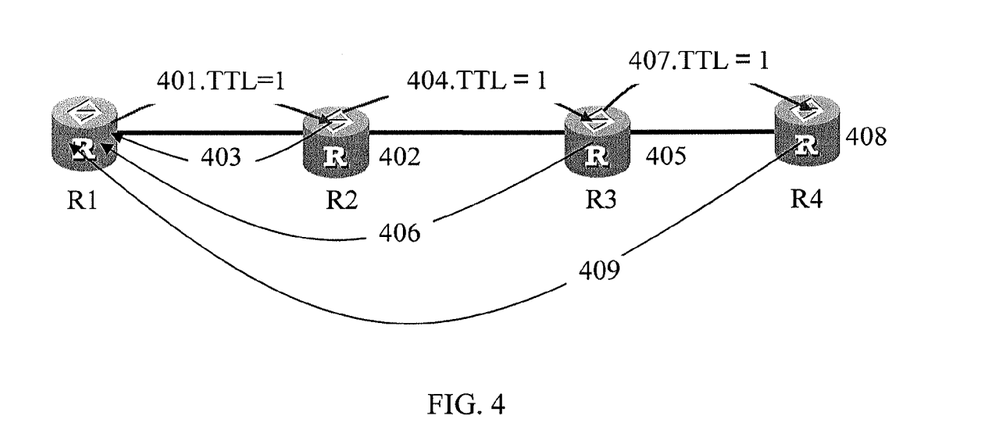
FIG. 4 is a schematic diagram of interaction according to another embodiment.

FIG. 4 is a schematic diagram of interaction for verifying network connectivity by applying the method disclosed herein. In FIG. 4, R1 is a detection initiation node, R2 and R3 are intermediate nodes, and R4 is a destination node. In this embodiment, the forward route (link and nodes) of the path to be detected may be the same as the backward route. As shown in FIG. 4, the troubleshooting method in this embodiment includes the following steps:

401. R1 sends a forward detection message to R2 by setting TTL to 1.

402. R1 receives a backward detection message returned by R2.

403. R2 keeps TTL=1 for the forward detection message, adds a label directed to R3, and sends the message to R3.

404. R1 receives a backward detection message returned by R3.

405. R3 keeps TTL=1 for the forward detection message, adds a label directed to R4, and sends the message to R4.

406. R1 receives the backward detection message returned by R4.

The steps of this embodiment are similar to the steps of the third embodiment. In the third embodiment, the first node R1 sends the forward detection message to the intermediate nodes R2 and R3 and the destination node R4 directly by setting TTL to 1, 2 and 3. In the fourth embodiment, the first node R1 sends the forward detection message to the next-hop node R2 by setting TTL to 1, and R2 returns a backward detection message; R2 goes on to send the forward detection message to the next-hop node by setting TTL to 1 until the message arrives at the destination node R4.

The processing mode of the nodes in the steps of the fourth embodiment is the same as the processing mode in the third embodiment, which is not further detailed here.

In this embodiment, the TTL is set to 1 when the first node R1 sends a forward detection message; the TTL expires when the forward detection message arrives at R2, and R2 handles the message, collects path information, and returns the path information in a backward detection message to the first node R1. Meanwhile, R2 sets TTL to 1 for the forward detection message, adds a label directed to R3, and sends the message to R3. The forward detection message arriving at R3 is handled in the same way, and finally arrives at the destination node R4. After collecting the path information, R4 returns the path information in a backward detection message to the first node. If a path is specified for the backward detection message, the backward detection message is returned along the specified path, or along the specified path or a non-specified path simultaneously according to the setting. By specifying a path for the backward detection message in the forward detection message, the technical solution in this embodiment detects the forward path and the backward path simultaneously, collects the path information at the same time, and detects the paths and verifies connectivity in both directions simultaneously by executing the troubleshooting method on only one side. The signaling overhead is reduced, and the implementation is simplified.

A troubleshooting apparatus is provided in another embodiment, and is detailed below with reference to an accompanying drawing.

Figure 5:
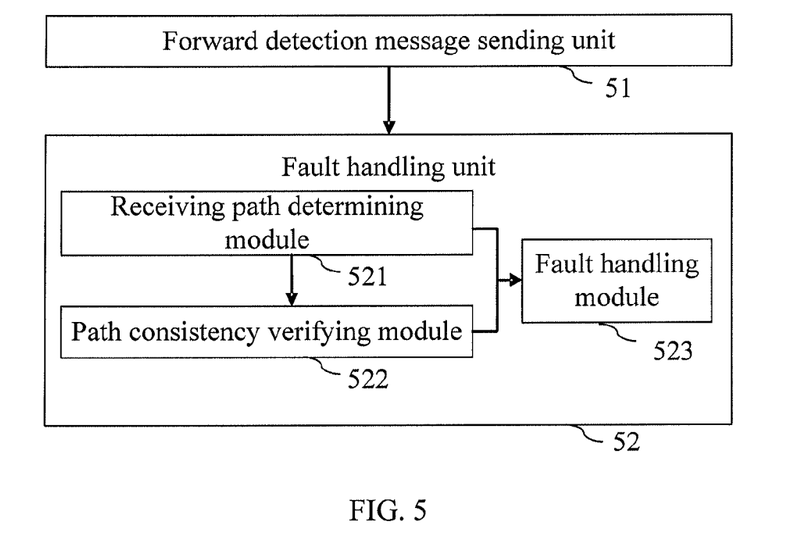
FIG. 5 is a block diagram of an apparatus according to an embodiment.

FIG. 5 is a block diagram of an apparatus according to an embodiment. As shown in FIG. 5, the troubleshooting apparatus in this embodiment includes:

a forward detection message sending unit 51, configured to send a forward detection message to at least one node on a path to be detected, where the forward detection message carries information about a forward path to be detected and information about a backward path to be detected; and a fault handling unit 52, configured to handle faults according to the backward detection message returned by the at least one node.

If at least one node is the destination node of the path to be detected, the forward detection message is forwarded to the destination node by the intermediate nodes of the path to be detected, and the fault handling unit 52 is configured to detect faults according to the backward detection message returned by the destination node.

If at least one node is the intermediate node and at least one node is the destination node of the path to be detected, the forward detection message is sent to the intermediate node and the destination node respectively, and the fault handling unit 52 is configured to detect and locate faults according to the backward detection message returned by the intermediate node and the destination node.

If at least one node is the intermediate node and at least one node is the destination node of the path to be detected, the forward detection message, the TTL of which is set to 1, is forwarded through the next-hop node, and the forwarding goes on until the message arrives at the destination node; and the fault handling unit 52 is configured to detect and locate faults according to the backward detection message returned by the intermediate node and the destination node.

The fault handling unit 52 includes a receiving path determining module 521, a path consistency verifying module 522, and a fault handling module 523.

The receiving path determining module 521 is configured to determine whether the backward detection message is returned along the specified backward path by comparing the backward path specified in the forward detection message for returning the backward detection message with the path in which the backward detection message has been received.

The path consistency verifying module 522 is configured to verify consistency of the backward path to be detected between a data plane and a control plane if the backward detection message is returned along the specified backward path.

The fault handling module 523 is configured to determine whether the path to be detected is faulty according to the verification result of the path consistency verifying module 522 or the determining result of the receiving path determining module 521.

If the verification result of the path consistency verifying module 522 is that the backward path to be detected is consistent between the data plane and the control plane, the fault handling module 523 checks whether the backward path to be detected is connected.

If the verification result of the path consistency verifying module 522 is that the backward path to be detected is not consistent between the data plane and the control plane, the fault handling module 523 proceeds according to the return code information in the backward detection message.

If the determining result of the receiving path determining module 521 is that the backward detection message is not returned along the specified backward path, but along other paths, the fault handling module 523 proceeds according to the return code information in the backward detection message returned by at least one node along the other path.

If the determining result of the receiving path determining module 521 is that the backward detection message is returned along the specified backward path and other paths simultaneously, the fault handling module 523 checks whether the path to be detected is connected according to the backward detection message received on the specified backward path.

The forward detection message may further carry an indication of collecting path information. The indication instructs at least one node to collect information about the path to be detected, and return the information through a backward detection message.

The troubleshooting apparatus in this embodiment specifies a path for the backward detection message in the forward detection message, and therefore, the forward path and the backward path are detected simultaneously, and the path information is collected at the same time. Moreover, the troubleshooting method can be executed on only one side to detect faults and verify connectivity in both directions simultaneously.

A troubleshooting method is provided in another embodiment, and is detailed below with reference to an accompanying drawing.

Figure 6:
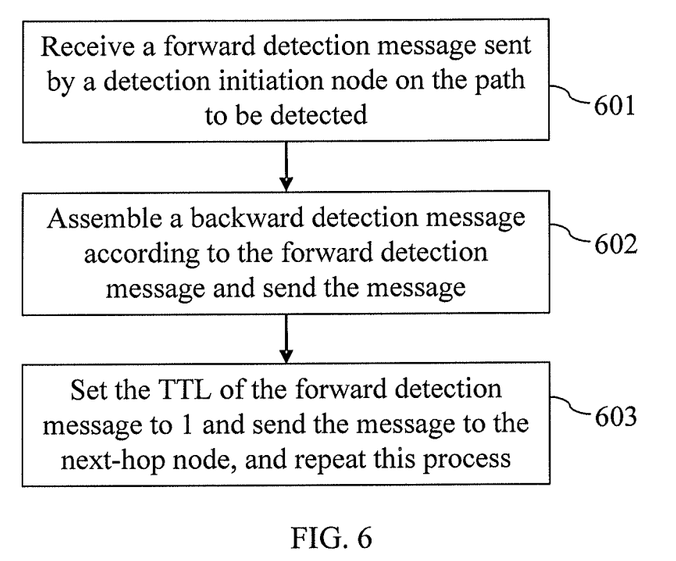
FIG. 6 is a method flowchart according to another embodiment.

FIG. 6 is a method flowchart according to an embodiment. As shown in FIG. 6, the troubleshooting method in this embodiment includes the following steps:

601. Receive a forward detection message sent by a detection initiation node on a path to be detected, where the forward detection message carries information about a forward path to be detected and information about a backward path to be detected.

602. Verify consistency of the forward path to be detected between a data plane and a control plane according to the forward detection message, assemble a backward detection message, and send the backward detection message to the detection initiation node.

If the forward detection message only carries information about the forward path to be detected, it is only necessary to verify consistency of the forward path to be detected, and the verification result serves as a basis for deciding whether to return a backward detection message to the detection initiation node. If it is decided to return the backward detection message to the detection initiation node, the message may be returned along a random path. In this way, the detection initiation node can check whether the link is connected according to the information in the backward detection message. For details, see the first embodiment to the fifth embodiment above.

The backward detection message may be assembled in the following way:

If the current node has the backward path to be detected specified in the information about the backward path to be detected in the forward detection message, the current node adds the path information about the backward path such as FEC information to a backward detection message according to the indication of collecting path information in the forward detection message, and sends the backward detection message to the detection initiation node along the specified backward path to be detected or along the specified backward path to be detected and other paths simultaneously.

If the current node does not have the backward path to be detected specified in the information about the backward path to be detected in the forward detection message, the current node adds return code information to a backward detection message, and sends the backward detection message to the detection initiation node along other paths.

If the current node is not the destination node of the path to be detected, but an intermediate node, the method in this embodiment further includes:

603. Set the TTL of the forward detection message to 1, and send the forward detection message to the next-hop node, whereupon the message is forwarded by next hops consecutively until the message arrives at the destination node, so that the next-hop node and the destination node can assemble the backward detection message according to the forward detection message and send the backward detection message to the detection initiation node.

The troubleshooting method in this embodiment is applicable when the detection initiation node detects connectivity of the link to be detected. For example, in the second embodiment, R4 may apply the method in this embodiment to interact with the detection initiation node R1 to detect connectivity of the link to be detected. The troubleshooting method in this embodiment is also applicable when the detection initiation node verifies connectivity of the link to be detected. For example, in the third embodiment and the fourth embodiment, R2, R3, and R4 may apply the method in this embodiment to interact with the detection initiation node R1 to verify connectivity of the link to be detected. For details, see the second embodiment to the fourth embodiment above.

The troubleshooting method in this embodiment assembles a backward detection message according to the forward detection message, and chooses whether to return a backward detection message according to the backward path specified in the forward detection message. In this way, the forward path and the backward path are detected simultaneously, and the path information is collected at the same time. Moreover, the troubleshooting method can detect faults and verify connectivity in both directions simultaneously and just needs to be executed on only one side.

A troubleshooting apparatus is provided in an embodiment, and is detailed below with reference to an accompanying drawing.

Figure 7:
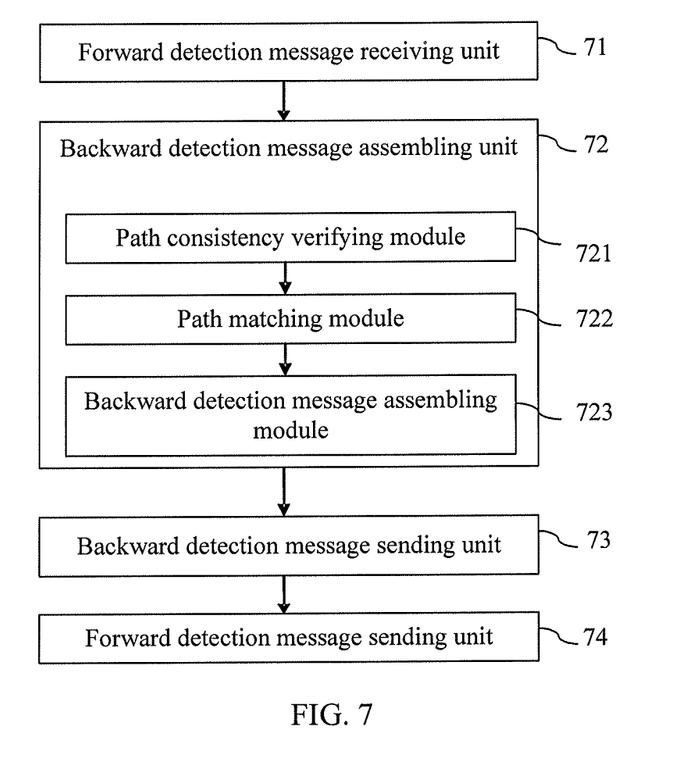
FIG. 7 is a block diagram of an apparatus according to another embodiment.

FIG. 7 is a block diagram of an apparatus according to an embodiment. As shown in FIG. 7, a troubleshooting apparatus in this embodiment includes:

a forward detection message receiving unit 71, configured to receive a forward detection message sent by a detection initiation node on a path to be detected, where the forward detection message carries information about a forward path to be detected and information about a backward path to be detected;

a backward detection message assembling unit 72, configured to assemble a backward detection message according to the forward detection message; and a backward detection message sending unit 73, configured to send the backward detection message to the detection initiation node.

According to this embodiment, the backward detection message assembling unit 72 includes: a path consistency verifying module 721, a path matching module 722, and a backward detection message assembling module 723.

The path consistency verifying module 721 is configured to verify whether the forward path to be detected is consistent between a data plane and a control plane.

The path matching module 722 is configured to match the backward path to be detected specified in the information about the backward path to be detected in the forward detection message.

The backward detection message assembling module 723 is configured to assemble the backward detection message according to the verification result of the path consistency verifying module 721 and the matching result of the path matching module 722.

The backward detection message assembling unit 72 is configured to add FEC information to a backward detection message if the current node has the backward path to be detected specified in the information about the backward path to be detected in the forward detection message; and the backward detection message sending unit 73 sends the backward detection message to the detection initiation node along the specified backward path to be detected, or along the specified backward path to be detected and other paths simultaneously.

The backward detection message assembling unit 72 is further configured to add return code information to a backward detection message if the current node does not have the backward path to be detected specified in the information about the backward path to be detected in the forward detection message; and the backward detection message sending unit 73 sends the backward detection message to the detection initiation node along other paths.

The backward detection message assembling unit 72 is further configured to collect information about the path to be detected if the forward detection message carries an indication information of collecting path information, and add the collected path information to the backward detection message.

According to this embodiment, the troubleshooting apparatus may further include:

a forward detection message sending unit 74, configured to set the TTL of the forward detection message to 1, and send the forward detection message to the next-hop node, whereupon the message is forwarded by next-hop nodes consecutively until the message arrives at the destination node, so that the next-hop node and the destination node can assemble the backward detection message according to the forward detection message and send the backward detection message to the detection initiation node.

The troubleshooting apparatus in this embodiment assembles a backward detection message according to the forward detection message, and chooses whether to return a backward detection message according to the backward path specified in the forward detection message. In this way, the forward path and the backward path are detected simultaneously, and the path information is collected at the same time. Moreover, the troubleshooting method can detect faults and verify connectivity in both directions simultaneously and just needs to be executed on only one side.

The method or steps described herein may be implemented through hardware directly or through a software module of a processor, or through both of them. The software module may be located in a Random Access Memory (RAM), a computer memory, a Read Only Memory (ROM), an Electrically Programmable Read Only Memory (EPROM), an Electrically Erasable Programmable Read Only Memory (EEPROM), a register, a hard disk, a removable disk, a Compact Disk-Read Only Memory (CD-ROM), or any other storage media well-known in the art.

The objectives, technical solution, and benefits of the embodiments are detailed above. While various exemplary embodiments have been described, the claims are not limited to such embodiments. Other embodiments may be derived by making various modifications, equivalent replacements, and improvements. Such embodiments are understood to fall within the scope of the claims.

What is claimed is:

1. A troubleshooting method, comprising:

sending, by a detection initiation node, a forward detection message to at least one node on a path to be detected, wherein the forward detection message carries information identifying a forward path to be detected and information identifying a backward path to be detected, the information identifying the backward path to be detected includes Forwarding Equivalence Class (FEC), Label Switched Path Identifier (LSP ID) or Tunnel Identifier (Tunnel ID);

receiving, by the detection initiation node, a backward detection message returned by the at least one node in response to the forward detection message;

determining, by the detection initiation node, whether the detection initiation node received the returned backward detection message along a backward path that is the backward path identified in the forward detection message; and performing, by the detection initiation node, a fault detection with consideration of the determination.

2. The method according to the claim 1, wherein:

the step of performing the fault detection with consideration of the determination comprises:

checking whether the path to be detected is connected according to the backward detection message if the backward detection message returned by the at least one node is received on the backward path specified in the information about the backward path to be detected.

3. The method according to the claim 1, wherein:

the step of performing the fault detection with consideration of the determination comprises:

processing according to return code information in the backward detection message returned by the at least one node along other paths if the backward detection message returned by the at least one node is received on the other path.

4. The method according to the claim 1, wherein:

the step of performing the fault detection with consideration of the determination comprises:

checking whether the path to be detected is connected according to the backward detection message received on the backward path to be detected if the backward detection message returned by the at least one node is received on the backward path specified in the information about the backward path to be detected and other paths.

5. The method according to claim 1, wherein:

the step of checking whether the path to be detected is connected according to the backward detection message comprises:

checking whether the path to be detected is consistent between a data plane and a control plane according to the backward detection message; if the path is consistent, determining that the path to be detected is connected.

6. The method according to the claim 1, wherein:

the step of performing the fault detection with consideration of the determination comprises:

detecting, by the detection initiation node, a fault when the backward path along which the detection initiation node receives the returned backward detection message is a backward path different from the backward path identified in the forward detection message.

7. A troubleshooting apparatus, comprising:

a transmitter configured to send a forward detection message to at least one node on a path to be detected, wherein the forward detection message carries information identifying a forward path to be detected and information identifying a backward path to be detected, wherein the information identifying the backward path to be detected includes Forwarding Equivalence Class (FEC), Label Switched Path Identifier (LSP ID) or Tunnel Identifier (Tunnel ID);

a receiver configured to receive a backward detection message returned by the at least one node in response to the forward detection message through the specified backward path to be detected; and a processor configured to determine whether the detection initiation node received the returned backward detection message along a backward path that is the backward path identified in the forward detection message; and perform a fault detection with consideration of the determination.

8. The troubleshooting apparatus, according to the claim 7, wherein the processor performs the fault detection with consideration of the determination comprises:

detecting, a fault when the backward path along which the receiver receives the returned backward detection message is a backward path different from the backward path identified in the forward detection message.

9. A troubleshooting method, comprising:

receiving a forward detection message sent by a detection initiation node on a path to be detected, wherein the forward detection message carries information identifying a forward path to be detected and information identifying a backward path to be detected, wherein the information about the backward path to be detected includes Forwarding Equivalence Class (FEC), Label Switched Path Identifier (LSP ID) or Tunnel Identifier (Tunnel ID); and assembling a backward detection message according to the forward detection message, and in response to the forward detection message, sending the backward detection message to the detection initiation node through the specified backward path to be detected.

10. The method according to claim 9, wherein:

the step of assembling the backward detection message according to the forward detection message comprises:

checking whether the forward path to be detected is consistent between a data plane and a control plane according to the forward detection message, and matching the backward path if the forward path is consistent.

11. The method according to claim 10, wherein the step of matching of the backward path comprises:

if a current node has the backward path specified in the information about the backward path to be detected, adding the information about the backward path to the backward detection message, and sending the backward detection message to the detection initiation node along the specified backward path to be detected, or along the specified backward path and other paths simultaneously.

12. The method according to claim 10, wherein the step of matching of the backward path comprises:

if a current node does not have the backward path specified in the information about the backward path to be detected, adding return code information to the backward detection message, and sending the backward detection message to the detection initiation node along other paths.

13. The method according to claim 12, wherein:

the step of assembling the backward detection message according to the forward detection message further comprises:

if the forward detection message carries an indication of collecting path information, collecting information about the path to be detected according to the indication and adding the collected path information to the backward detection message.

14. A troubleshooting apparatus, comprising:

a receiver configured to receive a forward detection message sent by a detection initiation node on a path to be detected, wherein the forward detection message carries information about a forward path to be detected and information about a backward path to be detected, wherein the information about the backward path includes Forwarding Equivalence Class (FEC), Label Switched Path Identifier (LSP ID) or Tunnel Identifier (Tunnel ID), which is used to specify the backward path to be detected;

a processor configured to assemble a backward detection message according to the forward detection message; and a transmitter configured to send the backward detection message to the detection initiation node through the specified backward path to be detected.

* * * * *